(12) United States Patent
Inagaki

(10) Patent No.: US 7,110,754 B2
(45) Date of Patent: Sep. 19, 2006

(54) RADIO SOFTWARE ACQUISITION SYSTEM, RADIO SOFTWARE ACQUISITION METHOD AND RADIO SOFTWARE ACQUISITION PROGRAM

(75) Inventor: Fumiyuki Inagaki, Tokyo (JP)

(73) Assignee: NEC Corporation, Tokyo (JP)

( * ) Notice: Subject to any disclaimer, the term of this patent is extended or adjusted under 35 U.S.C. 154(b) by 188 days.

(21) Appl. No.: 10/853,281

(22) Filed: May 26, 2004

(65) Prior Publication Data

US 2004/0242236 A1 Dec. 2, 2004

(30) Foreign Application Priority Data

May 27, 2003 (JP) ............................. 2003-148877

(51) Int. Cl.
*H04M 3/00* (2006.01)
(52) U.S. Cl. ................ 455/419; 455/414.1; 455/414.2; 455/435.1; 455/456.1
(58) Field of Classification Search ................ 455/419, 455/414.2; 709/219; 713/100; 717/168
See application file for complete search history.

(56) References Cited

U.S. PATENT DOCUMENTS

| | | | |
|---|---|---|---|
| 6,138,009 A | 10/2000 | Birgerson | |
| 6,622,017 B1 * | 9/2003 | Hoffman | 455/419 |
| 6,650,902 B1 * | 11/2003 | Richton | 455/456.3 |
| 6,937,877 B1 * | 8/2005 | Davenport | 455/552.1 |
| 2003/0036824 A1 * | 2/2003 | Kuroda et al. | 701/1 |
| 2003/0046304 A1 * | 3/2003 | Peskin et al. | 707/104.1 |
| 2003/0097423 A1 * | 5/2003 | Ozawa et al. | 709/219 |
| 2004/0198386 A1 * | 10/2004 | Dupray | 455/456.1 |
| 2004/0198426 A1 * | 10/2004 | Squibbs et al. | 455/555 |
| 2004/0253965 A1 * | 12/2004 | Sato et al. | 455/456.3 |
| 2005/0097225 A1 * | 5/2005 | Glatt et al. | 709/248 |
| 2005/0125525 A1 * | 6/2005 | Zhou et al. | 709/223 |
| 2005/0227684 A1 * | 10/2005 | Niedermeier et al. | 455/420 |

FOREIGN PATENT DOCUMENTS

| | | |
|---|---|---|
| EP | 1 043 906 A2 | 10/2000 |
| EP | 1 241 830 A1 | 9/2002 |
| GB | 2 340 346 A | 2/2000 |
| GB | 2340346 A * | 2/2000 |
| GB | 2374766 A * | 10/2002 |
| JP | 2002-199451 A | 7/2002 |

* cited by examiner

*Primary Examiner*—George Eng
*Assistant Examiner*—Ariel Balaoing
(74) *Attorney, Agent, or Firm*—Sughrue Mion, PLLC

(57) ABSTRACT

A system, method and program for downloading radio software necessary for a user to a cellular phone or a radio terminal in advance so that the radio software is readily available. With the use of a service terminal, an in-service area management server, a radio software management server, a terminal management server, an accounting management server, a ticket information management server, an available service management server, a personal information management server, and an other provider management server, necessary radio software is downloaded from the radio software management server to a radio terminal or a cellular phone via a network according to location information and time information included in ticket information or personal information stored in the radio terminal or the cellular phone.

37 Claims, 10 Drawing Sheets

| TICKET INFORMATION | | |
|---|---|---|
| TYPE | LOCATION INFORMATION | TIME INFORMATION |
| AIR TICKET | COUNTRY : A, AREA : 2, CITY : 3 | FROM MAY 12 TO MAY 14 |

(b)

| TERMINAL INFORMATION | | |
|---|---|---|
| PERFORMANCE | FREQUENCY RANGE | RADIO SYSTEM |
| clock=200 [MHz], RAM=1 [Mbyte], ROM=2 [Mbyte] | 800 [MHz] – 2 [GHz] | N |

(c)

| PERSONAL INFORMATION | | |
|---|---|---|
| SCHEDULE | LOCATION INFORMATION | TIME INFORMATION |
| ATTEND CONFERENCE | COUNTRY : A, AREA : 2, CITY : 3 | MAY 12 |

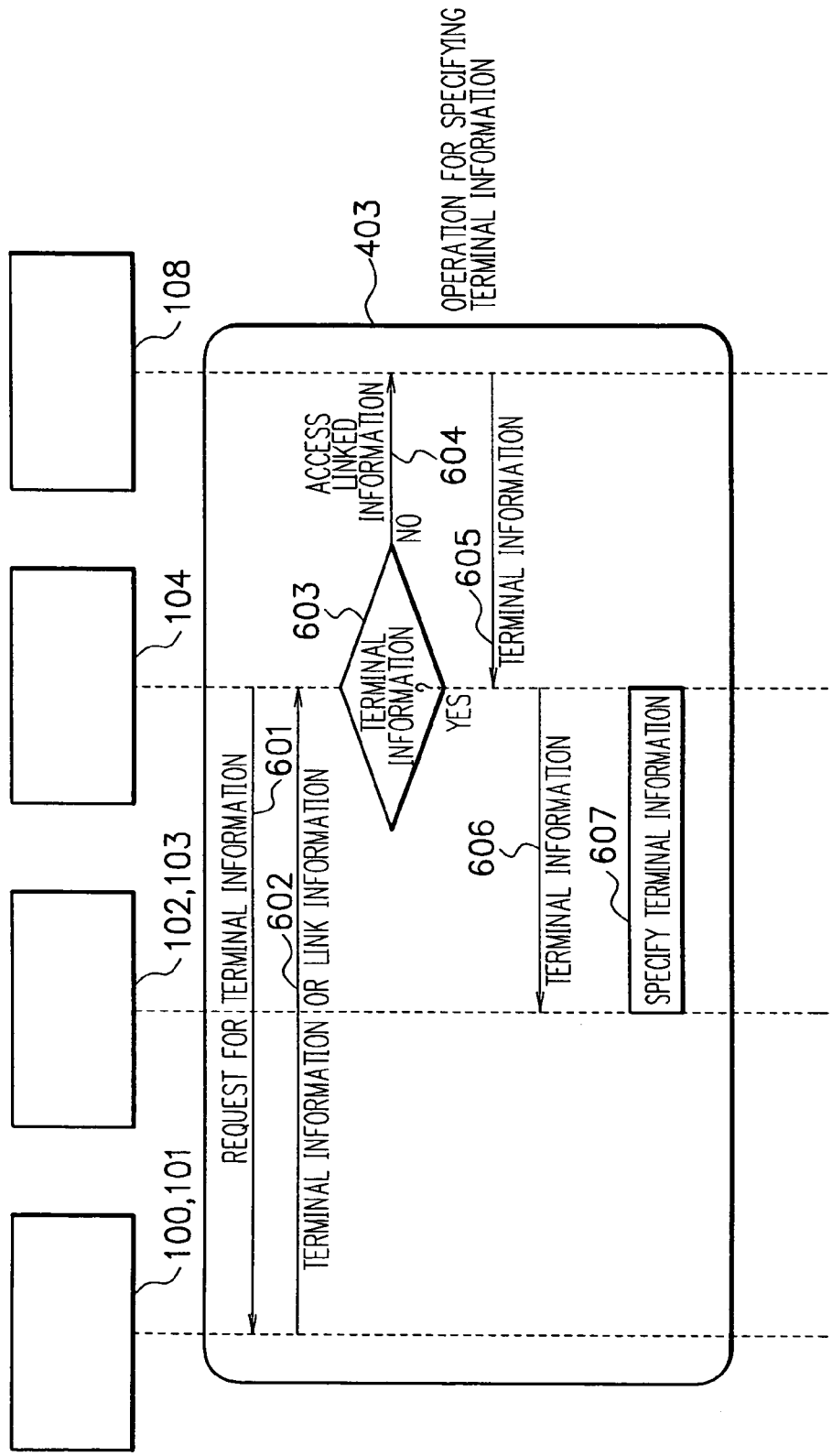

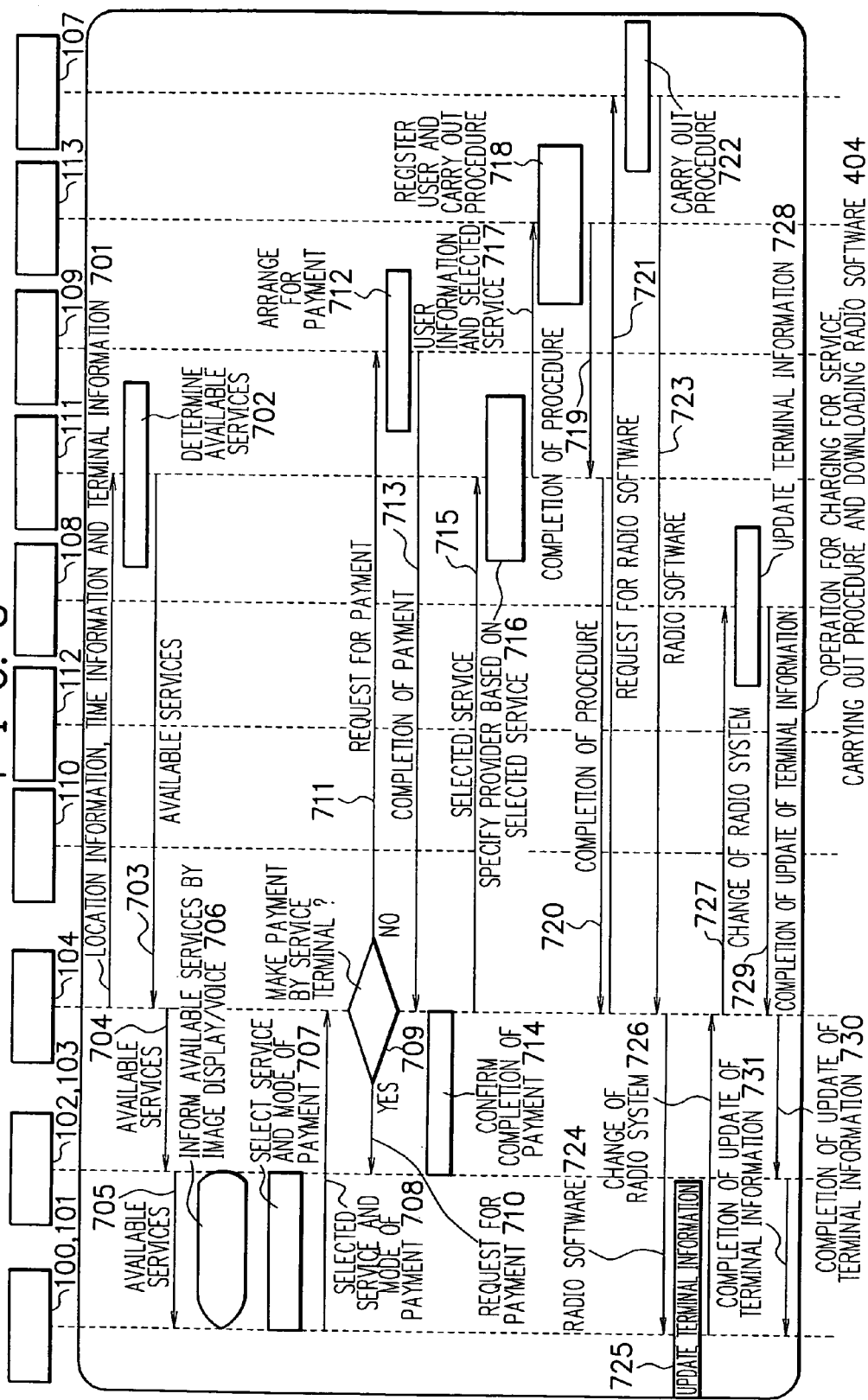

FIG. 9

| DESTINATION (COUNTRY, AREA, CITY) | | FEATURE | CHARGE | | | | DOWNLOAD CHARGE | EXPECTED USAGE CHARGE [YEN/MONTH] | PROVIDER |
|---|---|---|---|---|---|---|---|---|---|
| | | | CALL | E-MAIL | WEB | CHAT | | | |
| A | AREA:1 (CITY:1) | MAIL-ORIENTED (E-MAIL PHOTO) | ¥20 (per min.) | ○ ¥8 (per mail) | ○ ¥0.2 (per packet) | — | ¥300 | ¥6080 | A |
| | | CHEAP CALL RATE | ○ ¥10 | ○ ¥10 | — | — | ¥200 | ¥3600 | B |
| | | WEB-READY | ○ ¥25 | ○ ¥12 | ○ ¥0.2 | ○ ¥0.2 | ¥250 | ¥7760 | C |
| | AREA:2 (CITY:2) | CHEAP DOWNLOAD | ○ ¥20 | — | — | — | ¥100 | ¥4800 | D |
| | (CITY:3) | CHEAP E-MAIL | ○ ¥20 | ○ ¥5 | ○ ¥0.1 | — | ¥300 | ¥5520 | E |
| | | FIXED CHARGE (¥4800 per month) | ○ | — | — | ○ ¥0.1 | — | ¥4800 | B |
| B | | BROAD SERVICE AREA | ○ ¥20 | ○ ¥10 | ○ ¥0.1 | — | ¥250 | ¥6160 | A |
| | AREA:2 (CITY:4) | CHEAP DOWNLOAD | ○ ¥25 | ○ ¥10 | — | — | ¥100 | ¥7200 | B |
| | | CHEAP E-MAIL | ○ ¥20 | ○ ¥8 | ○ ¥0.2 | — | ¥300 | ¥6080 | B |

| ADD DESTINATION (COUNTRY, AREA, CITY) |
|---|

REFERENCE: LAST MONTH'S USAGE

| CALL | E-MAIL | WEB | CHAT | USAGE CHARGE | PROVIDER |
|---|---|---|---|---|---|
| 240 min. ¥10 per min. | 120 ¥8 per mail | 1500 ¥0.2 per packet | — | ¥3680 | X |

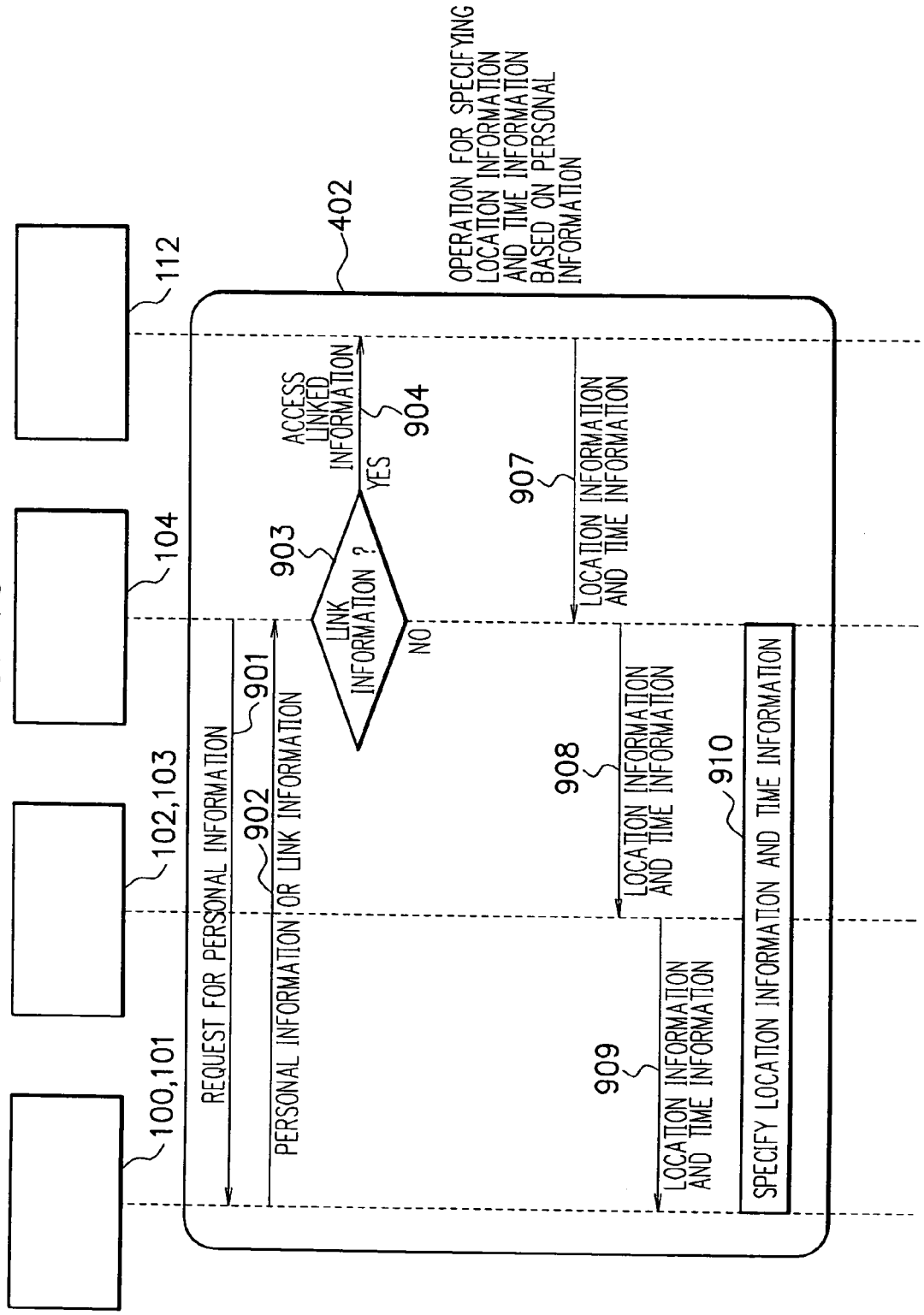

RADIO SOFTWARE ACQUISITION SYSTEM, RADIO SOFTWARE ACQUISITION METHOD AND RADIO SOFTWARE ACQUISITION PROGRAM

FIELD OF THE INVENTION

The present invention relates to a system, method and program for obtaining radio software, and more particularly, to a system, method and program for obtaining radio software automatically.

BACKGROUND OF THE INVENTION

In order to enable the update of software on a radio terminal having access to a variety of radio systems, for example, there has been proposed a software radio terminal in Japanese Patent Application laid open No. 2002-199451. The software radio terminal allows a user to select a radio system (service) based on current location information, and downloads software corresponding to the selected system.

The prior art, however, has some problems. The first problem is that, when a user of the software radio terminal has entered into the service area of another radio system, the user cannot utilize radio services of the radio system until downloading of radio software corresponding to the radio system is completed. This is because the user selects a radio system based on current location information, and software is downloaded after that.

The second problem is that software download services cannot be offered to a radio terminal having no means for specifying its current location. That is, the software radio terminal requires a means for specifying its current location to use software download services.

The third problem is that the user cannot utilize services offered by other telecommunications carriers or providers simply through downloading of software corresponding to a radio system. The user is allowed to utilize services offered by another telecommunications carrier only when he/she has applied for registration as a user with the telecommunications carrier in some way.

SUMMARY OF THE INVENTION

It is therefore an object of the present invention to provide a system, method and program by which relevant location information and time information are automatically specified from various types of ticket information and personal information stored in a portable radio unit (radio terminal, cellular phone, etc.) so that a user can utilize radio software immediately in a place (location) where he/she will stay at a time on a date (time) in the future.

In accordance with the first aspect of the present invention, to achieve the above objects, there is provided a radio software acquisition system comprising a portable radio terminal, an in-service area management server, an available service management server, and a radio software management server, wherein: the portable radio terminal stores terminal information and ticket information including location information and time information in a storage, sends the ticket information and terminal information read out of the storage to the in-service area management server so as to be informed of available services, informs the in-service area management server of a service to be used selected from the available services by a user, receives radio software and stores the radio software in the storage; the in-service area management server forwards the ticket information and terminal information received from the portable radio terminal to the available service management server so as to be informed of available services, informs the portable radio terminal of the available services, forwards information as to the selected service received from the portable radio terminal to the radio software management server, and forwards radio software received from the radio software management server to the portable radio terminal; the available service management server determines available services based on the terminal information and the location information and time information included in the ticket information received from the in-service area management server, and informs the in-service area management server of the available services; and the radio software management server receives the information as to the selected service from the in-service area management server, and sends radio software corresponding to the selected service to the in-service area management server.

In accordance with the second aspect of the present invention, the radio software acquisition system in the first aspect further comprises a ticket information management server and a terminal management server, wherein: the portable radio terminal stores terminal link information indicating the location of the terminal information and ticket link information indicating the location of the location information and time information in a storage, sends the ticket link information and terminal link information read out of the storage to the in-service area management server so as to be informed of available services, informs the in-service area management server of a service to be used selected from the available services by a user, receives radio software and stores the radio software in the storage; and the in-service area management server receives the ticket link information and terminal link information from the portable radio terminal, fetches the ticket information from the ticket information management server based on the ticket link information, fetches the terminal information from the terminal management server based on the terminal link information, sends the ticket information and terminal information to the available service management server so as to be informed of available services, informs the portable radio terminal of the available services, forwards information as to the selected service received from the portable radio terminal to the radio software management server, and forwards radio software received from the radio software management server to the portable radio terminal.

In accordance with the third aspect of the present invention, there is provided a radio software acquisition system comprising a portable radio terminal, an in-service area management server, an available service management server, and a radio software management server, wherein: the portable radio terminal stores terminal information and personal information including location information and time information in a storage, sends the personal information and terminal information read out of the storage to the in-service area management server so as to be informed of available services, informs the in-service area management server of a service to be used selected from the available services by a user, receives radio software and stores the radio software in the storage; the in-service area management server forwards the personal information and terminal information received from the portable radio terminal to the available service management server so as to be informed of available services, informs the portable radio terminal of the available services, forwards information as to the selected service received from the portable radio terminal to the radio software management server, and forwards radio software received from the radio software management server to the portable radio terminal; the available service management server determines available services based on the terminal information and the location information and time information included in the personal information received from the in-service area management server, and informs the in-service area management server of the available services; and the radio software management server receives the information as to the selected service from the in-service area management server, and sends radio software corresponding to the selected service to the in-service area management server.

In accordance with the fourth aspect of the present invention, the radio software acquisition system in the third aspect further comprises a personal information management server and a terminal management server, wherein: the portable radio terminal stores terminal link information indicating the location of the terminal information and personal link information indicating the location of the location information and time information in a storage, sends the personal link information and terminal link information read out of the storage to the in-service area management server so as to be informed of available services, informs the in-service area management server of a service to be used selected from the available services by a user, receives radio software and stores the radio software in the storage; and the in-service area management server receives the personal link information and terminal link information from the portable radio terminal, fetches the personal information from the personal information management server based on the personal link information, fetches the terminal information from the terminal management server based on the terminal link information, sends the personal information and terminal information to the available service management server so as to be informed of available services, informs the portable radio terminal of the available services, forwards information as to the selected service received from the portable radio terminal to the radio software management server, and forwards radio software received from the radio software management server to the portable radio terminal.

In accordance with the fifth aspect of the present invention, the radio software acquisition system in one of the first to fourth aspects further comprises an accounting management server, wherein the in-service area management server requests the accounting management server to make a charge for the service selected by the portable radio terminal, and the accounting management server makes a charge for the selected service in response to the request from the in-service area management server.

In accordance with the sixth aspect of the present invention, the radio software acquisition system in one of the first to fifth aspects further comprises an other provider management server, wherein: the other provider management server receives the information as to the selected service from the available service management server, carries out a procedure for making the selected service available to the portable radio terminal, and informs the available service management server that the necessary procedure has been completed; the available service management server informs the other provider management server of the selected service, and forwards information as to the completion of the necessary procedure received from the other provider management server to the in-service area management server; and the in-service area management server receives the information as to the completion of the necessary procedure from the available service management server, and sends the information as to the selected service to the radio software management server.

In accordance with the seventh aspect of the present invention, in the radio software acquisition system in one of the second, fourth, fifth and sixth aspects, having received the radio software, the portable radio terminal updates radio system information included in the terminal information stored in the storage, and sends information as to the update of the terminal information to the in-service area management server; and having received the information as to the update of the terminal information, the in-service area management server forwards the information to the terminal management server.

In accordance with the eighth aspect of the present invention, in the radio software acquisition system in one of the first to seventh aspects, the portable radio selects a service to be used from among available services according to preestablished rules.

In accordance with the ninth aspect of the present invention, there is provided a radio software acquisition method for a radio software acquisition system comprising a portable radio terminal, an in-service area management server, an available service management server, and a radio software management server, the radio software acquisition method comprising: a portable radio step at which the portable radio terminal stores terminal information and ticket information including location information and time information in a storage, sends the ticket information and terminal information read out of the storage to the in-service area management server so as to be informed of available services, informs the in-service area management server of a service to be used selected from the available services by a user, receives radio software and stores the radio software in the storage; an in-service area management step at which the in-service area management server forwards the ticket information and terminal information received from the portable radio terminal to the available service management server so as to be informed of available services, informs the portable radio terminal of the available services, forwards information as to the selected service received from the portable radio terminal to the radio software management server, and forwards radio software received from the radio software management server to the portable radio terminal; an available service management step at which the available service management server determines available services based on the terminal information and the location information and time information included in the ticket information received from the in-service area management server, and informs the in-service area management server of the available services; and a radio software management step at which the radio software management server receives the information as to the selected service from the in-service area management server, and sends radio software corresponding to the selected service to the in-service area management server.

In accordance with the tenth aspect of the present invention, in the radio software acquisition method in the ninth aspect, the radio software acquisition system further comprising a ticket information management server and a terminal management server: at the portable radio step, the portable radio terminal stores terminal link information indicating the location of the terminal information and ticket link information indicating the location of the location information and time information in a storage, sends the ticket link information and terminal link information read out of the storage to the in-service area management server so as to be informed of available services, informs the in-service area management server of a service to be used selected from the available services by a user, receives radio software and stores the radio software in the storage; and at the in-service area management step, the in-service area management server receives the ticket link information and terminal link information from the portable radio terminal, fetches the ticket information from the ticket information management server based on the ticket link information, fetches the terminal information from the terminal management server based on the terminal link information, sends the ticket information and terminal information to the available service management server so as to be informed of available services, informs the portable radio terminal of the available services, forwards information as to the selected service received from the portable radio terminal to the radio software management server, and forwards radio software received from the radio software management server to the portable radio terminal.

In accordance with the eleventh aspect of the present invention, there is provided a radio software acquisition method for a radio software acquisition system comprising a portable radio terminal, an in-service area management server, an available service management server, and a radio software management server, the radio software acquisition method comprising: a portable radio step at which the portable radio terminal stores terminal information and personal information including location information and time information in a storage, sends the personal information and terminal information read out of the storage to the in-service area management server so as to be informed of available services, informs the in-service area management server of a service to be used selected from the available services by a user, receives radio software and stores the radio software in the storage; an in-service area management step at which the in-service area management server forwards the personal information and terminal information received from the portable radio terminal to the available service management server so as to be informed of available services, informs the portable radio terminal of the available services, forwards information as to the selected service received from the portable radio terminal to the radio software management server, and forwards radio software received from the radio software management server to the portable radio terminal; an available service management step at which the available service management server determines available services based on the terminal information and the location information and time information included in the personal information received from the in-service area management server, and informs the in-service area management server of the available services; and a radio software management step at which the radio software management server receives the information as to the selected service from the in-service area management server, and sends radio software corresponding to the selected service to the in-service area management server.

In accordance with the twelfth aspect of the present invention, in the radio software acquisition method in the eleventh aspect, the radio software acquisition system further comprising a personal information management server and a terminal management server: at the portable radio step, the portable radio terminal stores terminal link information indicating the location of the terminal information and personal link information indicating the location of the location information and time information in a storage, sends the personal link information and terminal link information read out of the storage to the in-service area management server so as to be informed of available services, informs the in-service area management server of a service to be used selected from the available services by a user, receives radio software and stores the radio software in the storage; and at the in-service area management step, the in-service area management server receives the personal link information and terminal link information from the portable radio terminal, fetches the personal information from the personal information management server based on the personal link information, fetches the terminal information from the terminal management server based on the terminal link information, sends the personal information and terminal information to the available service management server so as to be informed of available services, informs the portable radio terminal of the available services, forwards information as to the selected service received from the portable radio terminal to the radio software management server, and forwards radio software received from the radio software management server to the portable radio terminal.

In accordance with the thirteenth aspect of the present invention, the radio software acquisition method in one of the ninth to twelfth aspects further comprises an accounting management step, wherein: at the in-service area management step, the in-service area management server requests an accounting management server to make a charge for the service selected by the portable radio terminal; and at the accounting management step, the accounting management server makes a charge for the selected service in response to the request from the in-service area management server.

In accordance with the fourteenth aspect of the present invention, the radio software acquisition method of one of the ninth to thirteenth aspects further comprises an other provider management step, wherein: at the other provider management step, an other provider management server receives the information as to the selected service from the available service management server, carries out a procedure for making the selected service available to the portable radio terminal, and informs the available service management server that the necessary procedure has been completed; at the available service management step, the available service management server informs the other provider management server of the selected service, and forwards information as to the completion of the necessary procedure received from the other provider management server to the in-service area management server; and at the in-service area management step, the in-service area management server receives the information as to the completion of the necessary procedure from the available service management server, and sends the information as to the selected service to the radio software management server.

In accordance with the fifteenth aspect of the present invention, in the radio software acquisition method in one of the tenth, twelfth, thirteenth and fourteenth aspects: at the portable radio step, having received the radio software, the portable radio terminal updates radio system information included in the terminal information stored in the storage, and sends information as to the update of the terminal information to the in-service area management server; and at the in-service area management step, having received the information as to the update of the terminal information, the in-service area management server forwards the information to the terminal management server.

In accordance with the sixteenth aspect of the present invention, in the radio software acquisition method in one of the ninth to fifteenth aspects, at the portable radio step, the portable radio selects a service to be used from among available services according to preestablished rules.

In accordance with the seventeenth aspect of the present invention, there is provided a radio software acquisition program for implementing the respective steps involved in the aforementioned radio software acquisition method in one of the ninth to sixteenth aspects on a computer.

BRIEF DESCRIPTION OF THE DRAWINGS

The objects and features of the present invention will become more apparent from the consideration of the following detailed description taken in conjunction with the accompanying drawings in which:

FIG. 6(a) is a diagram showing an example of ticket information;

FIG. 6(b) is a diagram showing an example of terminal information;

FIG. 6(c) is a diagram showing an example of personal information;

FIG. 7 is a sequence diagram showing the details of operation for specifying terminal information;

FIG. 8 is a sequence diagram showing the details of operation for accounting, making another provider's service available, and downloading radio software;

FIG. 9 is a diagram showing an example of service contents displayed on a display section;

FIG. 10 is a sequence diagram showing operation for specifying location information and time information according to the second embodiment of the present invention;

DESCRIPTION OF THE PREFERRED EMBODIMENTS

Figure 1:
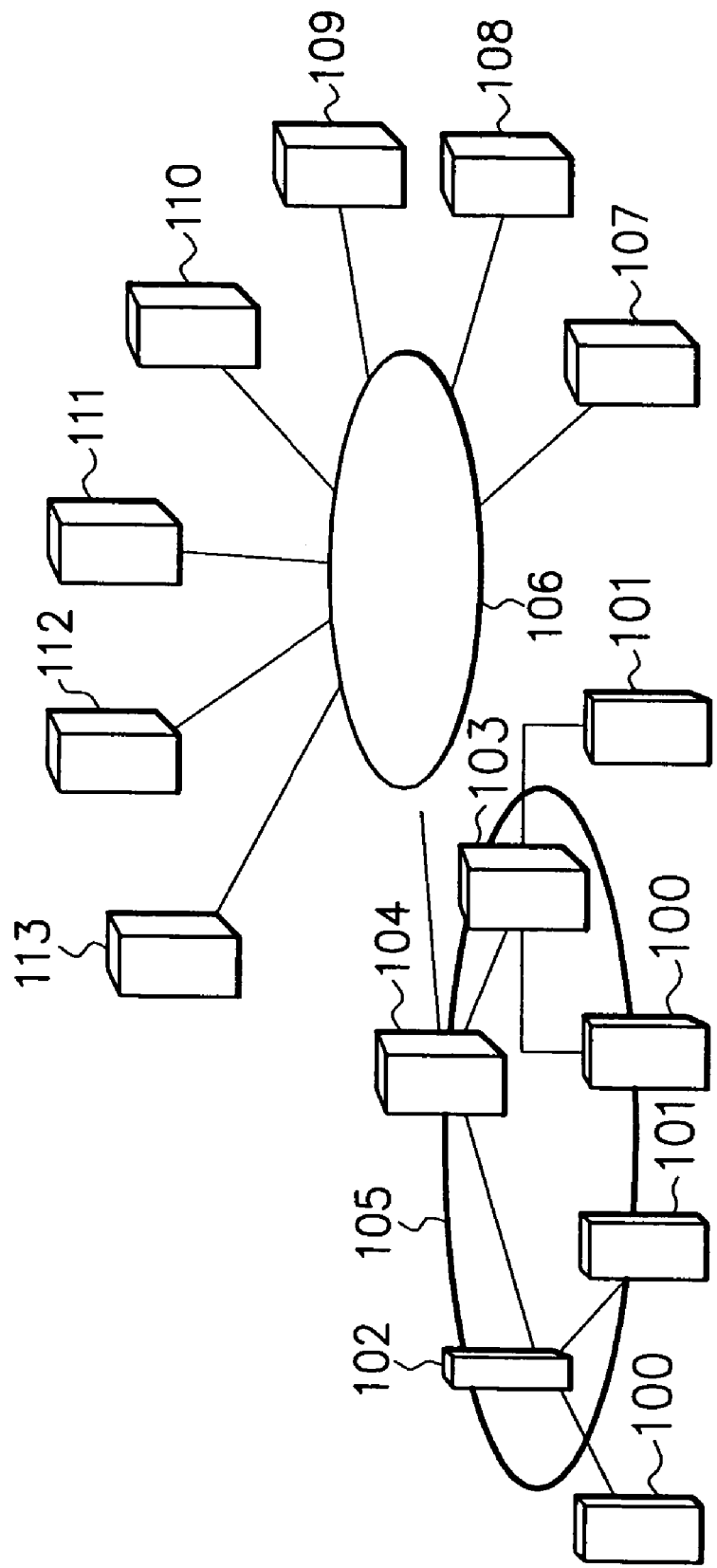
FIG. 1 is a block diagram showing the construction of a radio software acquisition system according to the first embodiment of the present invention.

Referring now to the drawings, a description of preferred embodiments of the present invention will be given in detail.

FIG. 1 is a block diagram showing the construction of a radio software acquisition system according to the first embodiment of the present invention.

As can be seen in FIG. 1, the radio software acquisition system of the first embodiment comprises one or more radio terminals 100, one or more cellular phones 101, one or more radio base stations 102, one or more service terminals 103, an in-service area management server 104, a network such as the Internet 106, a radio software management server 107, a terminal management server 108, an accounting management server 109, a ticket information management server 110, an available service management server 111, a personal information management server 112, and an other provider management server 113.

The radio base station 102, service terminal 103, and in-service area management server 104 are placed in a service area 105.

When a user of the radio terminal 100 or cellular phone 101 intends to add or update radio system software, the radio terminal 100 or cellular phone 101 is connected to the in-service area management server 104 in the service area 105 through the radio base station 102 and service terminal 103. The in-service area management server 104 accesses the radio software management server 107, terminal management server 108, accounting management server 109, ticket information management server 110, available service management server 111, personal information management server 112, and/or other provider management server 113 via the network 106 for obtaining various types of information. The servers are configured with computers.

Figure 2:
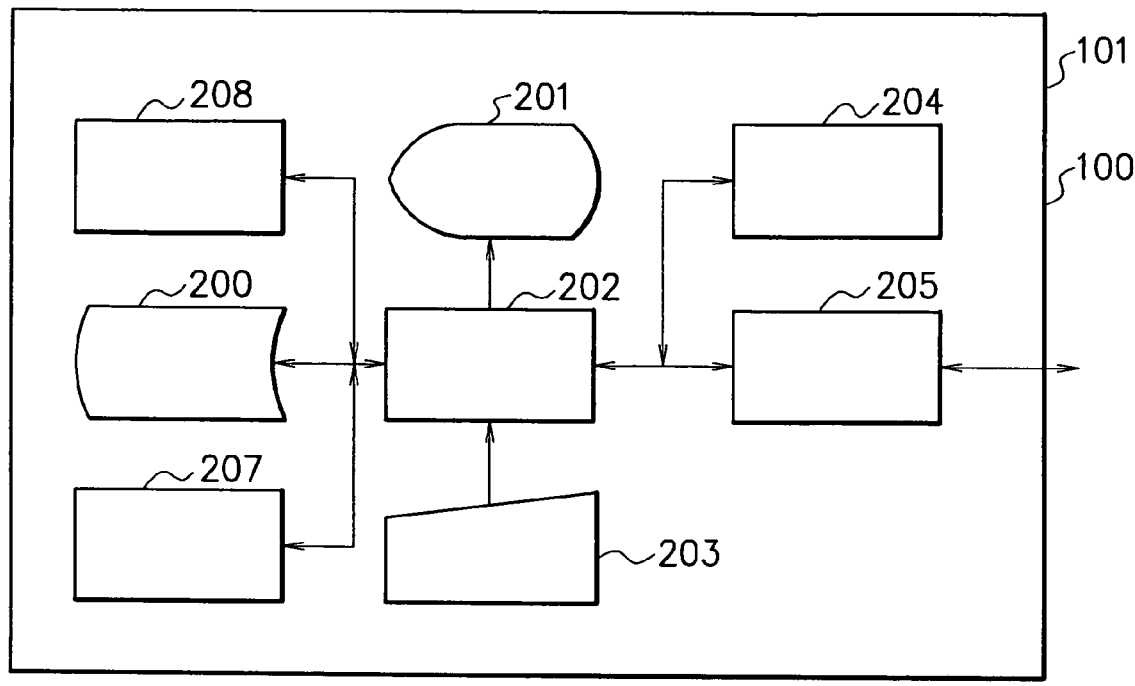
FIG. 2 is a block diagram showing the construction of a cellular phone.

FIG. 2 is a block diagram showing the construction of the cellular phone 101.

Referring to FIG. 2, the cellular phone 101 comprises a storage (memory) 200, a display section 201 for displaying images and the like, a control section 202, an input section 203 for accepting input by a user, a radio control section 204 for establishing a connection with the radio base station 102, a wire control section 205 for establishing a wired connection with the service terminal 103, a time information management section 207 and an output section 208. The storage 200 stores information including programs, data and the like. The control section 202 is connected to the radio control section 204 and wire control section 205, and controls the input/output of various types of information.

The control section 202 controls input information from the input section 203, output information to the display section 201 and the output section 208, the time information management section 207 and the storage 200 for storing necessary information. When the cellular phone 101 establishes wireless or radio communication with the service terminal 103, a wireless connection is established through the radio control section 204. Incidentally, the radio terminal 100 is also provided with the same constituents as shown in FIG. 2.

Figure 3:
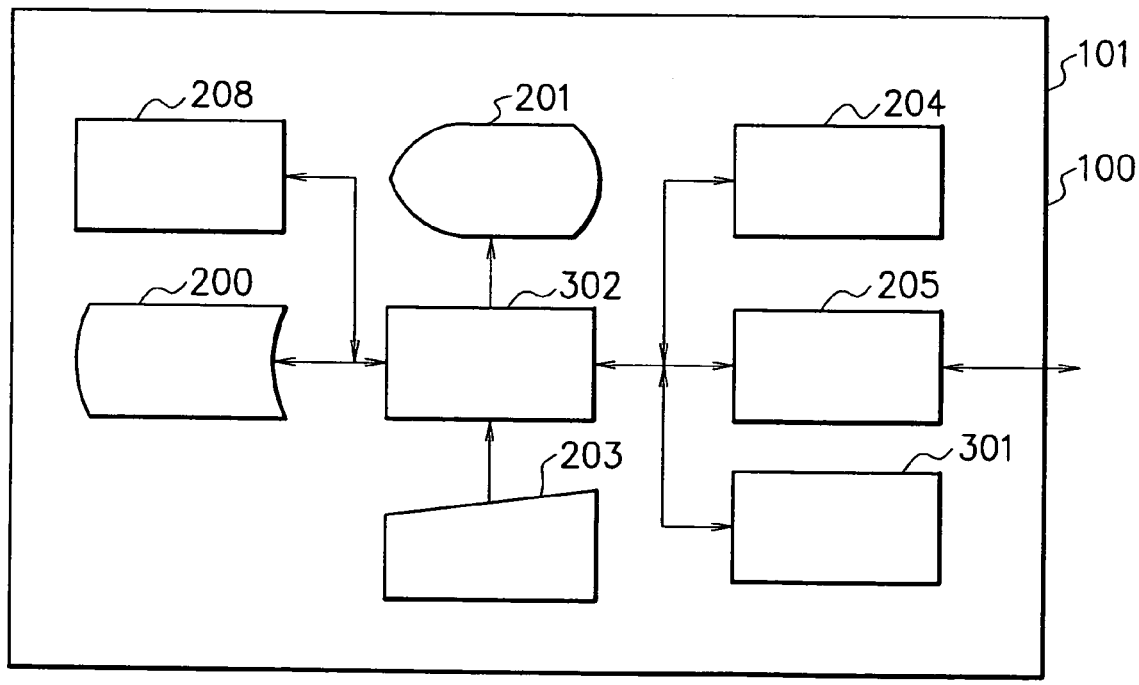
FIG. 3 is a block diagram showing the construction of a service terminal.

FIG. 3 is a block diagram showing the construction of the service terminal 103.

Referring to FIG. 3, the service terminal 103 comprises a storage 200, a display section 201, an input section 203, a radio control section 204, a wire control section 205, an output section 208, an accounting management section 301, and a control section 302.

Both the radio control section 204 and the wire control section 205 operate for establishing a connection with the radio terminal 100 or the cellular phone 101. The radio control section 204 and the wire control section 205 are connected with the control section 302 for the input/output of various types of information. The control section 302 controls input information from the input section 203, output information to the display section 201 and the output section 208, the storage 200 for storing necessary information, and the accounting management section 301 for managing accounting.

In the following, a description will be given of the operation of the radio software acquisition system according to the first embodiment of the present invention.

Figure 4:
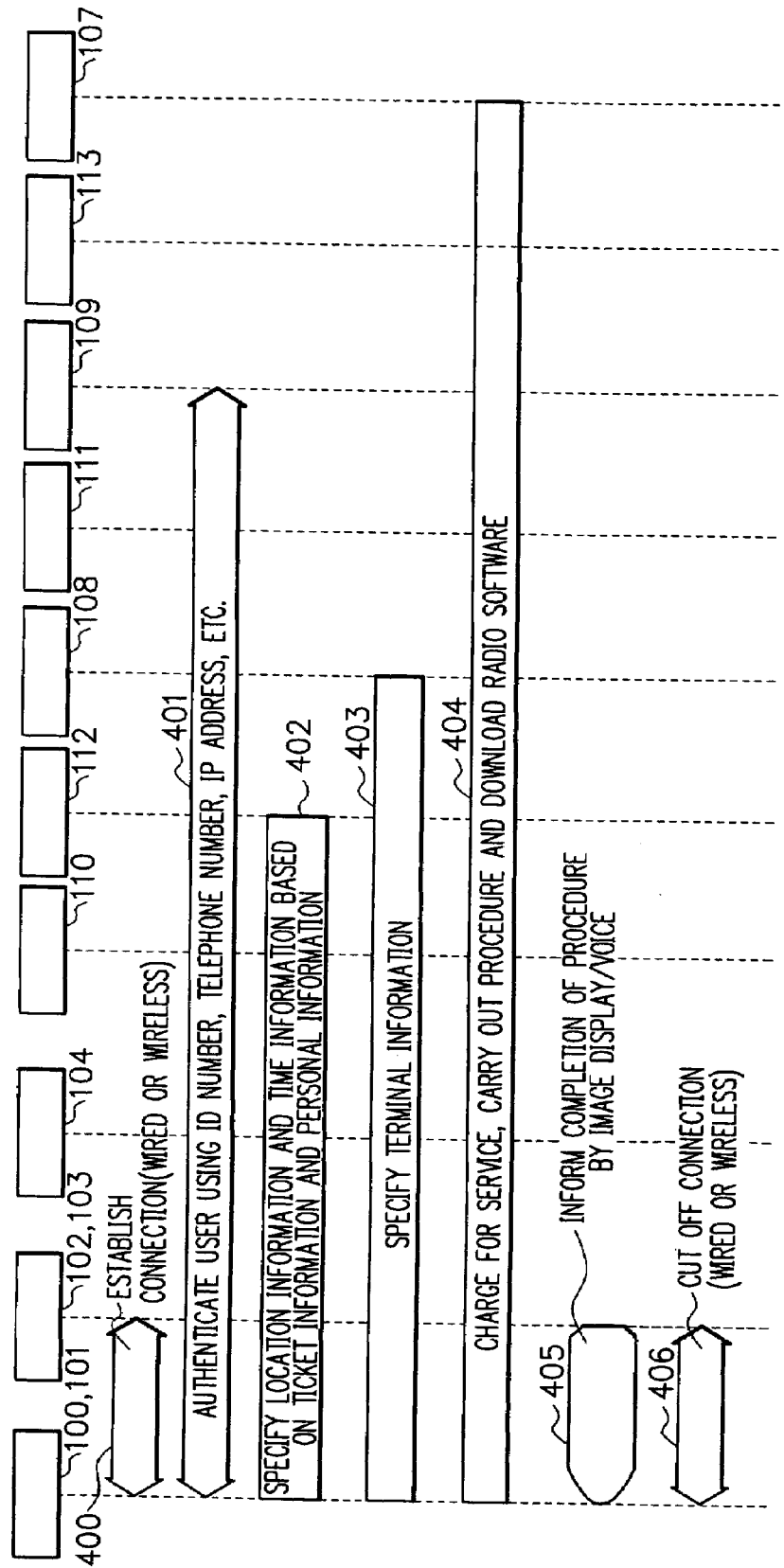
FIG. 4 is a sequence diagram showing the operation of the radio software acquisition system depicted in FIG. 1.

FIG. 4 is a sequence diagram showing the operation of the radio software acquisition system of the first embodiment.

Referring to FIG. 4, the radio terminal 100 or the cellular phone 101 establishes a wired or wireless connection with the radio base station 102 or the service terminal 103 (FIG. 4, step 400). Subsequently, the service terminal 103 or the in-service area management server 104 authenticates a user by collating an ID number that uniquely identifies the radio terminal 100 or the cellular phone 101, a telephone number, an IP address or the like obtained from the radio terminal 100 or the cellular phone 101 with authentication information stored in one or more of the terminal management server 108, accounting management server 109, ticket information management server 110, available service management server 111, personal information management server 112 (step 401).

In the next place, the in-service area management server 104 obtains ticket information or link information for accessing ticket information, such as URL, and personal information, and specifies relevant location information and time information (step 402).

Figure 5:
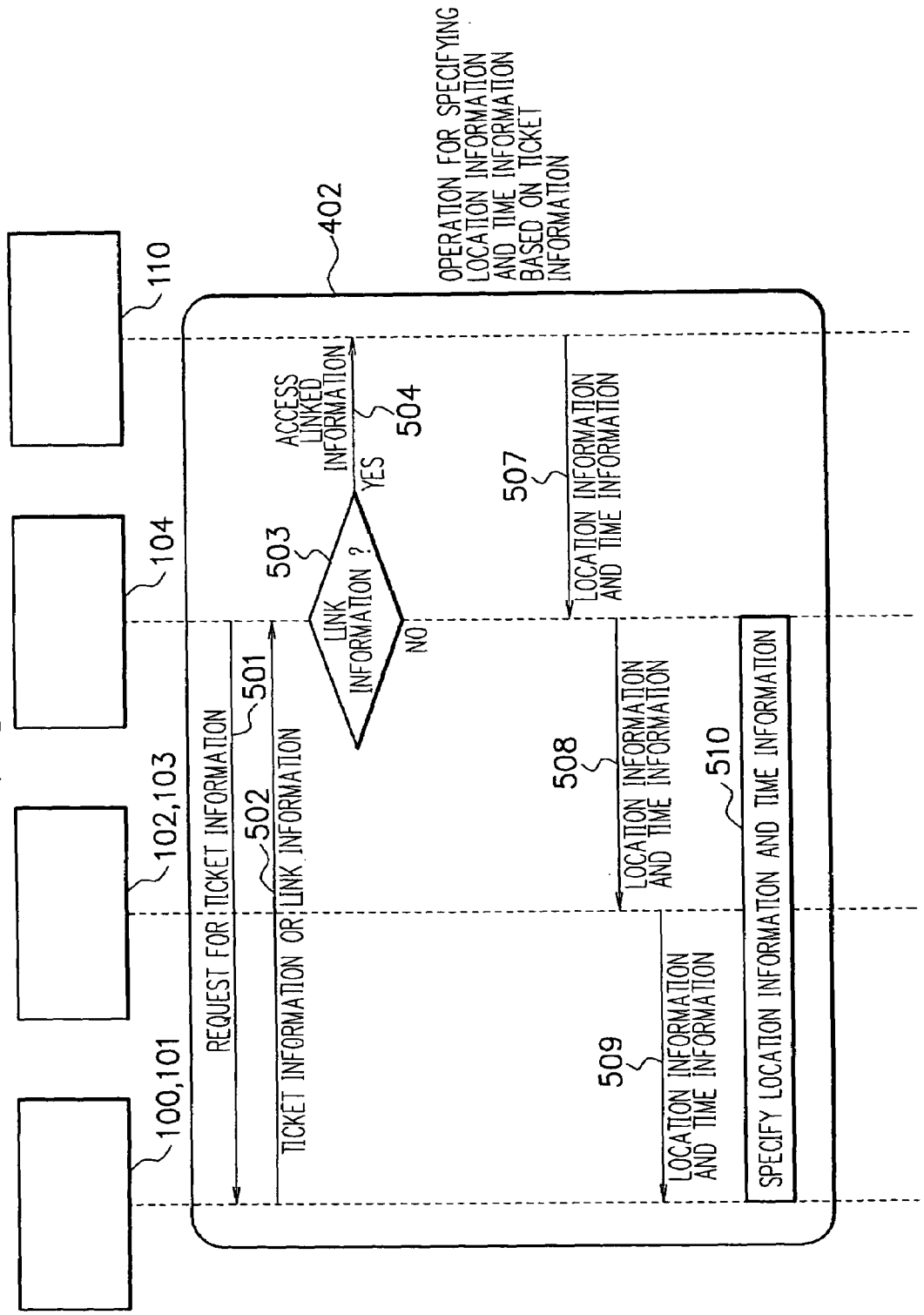
FIG. 5 is a sequence diagram showing the details of operation for specifying location information and time information with the use of ticket information.

FIG. 5 is a sequence diagram showing the details of operation for specifying location information and time information with the use of ticket information (or link information for accessing ticket information).

FIGS. 6(a) to 6(c) show an example of ticket information, terminal information, and personal information, respectively. In FIG. 6(a), ticket information includes ticket type (air ticket), location information (country: A, area: 2, city: 3) and time information (from May 12 to May 14).

Referring to FIG. 5, the in-service area management server 104 sends a request for ticket information to the radio terminal 100 or the cellular phone 101 via the radio base station 102 or the service terminal 103 (FIG. 5, step 501). The radio terminal 100 or the cellular phone 101 sends back ticket information or link information for accessing ticket information, which are stored in the storage 200, to the in-service area management server 104 (step 502). On this occasion, ticket information may be input to the service terminal 103 by the user through the input section 203 so that the in-service area management server 104 can obtain the ticket information therefrom.

The in-service area management server 104 determines whether obtained information is ticket information or link information (step 503). If the obtained information is link information (step 503, Yes), the in-service area management server 104 accesses linked ticket information in the ticket information management server 110 (step 504).

The ticket information management server 110 sends the in-service area management server 104 location information and time information related to the ticket information (step 507). The in-service area management server 104 forwards the location information and time information to the radio base station 102 or the service terminal 103 (step 508).

If the obtained information is ticket information (step 503, No), the in-service area management server 104 sends location information and time information included in the ticket information to the radio base station 102 or the service terminal 103 (step 508).

The radio base station 102 or the service terminal 103 informs the radio terminal 100 or the cellular phone 101 of the location information and time information received from the in-service area management server 104 (step 509). Thus, relevant location information and time information are specified by the ticket information (step 510).

Thereafter, terminal information is specified (FIG. 4, step 403).

In FIG. 6(b), terminal information includes performance (clock=200 MHz, RAM=1 Mbyte, ROM=2 Mbyte), frequency range (800 MHz to 2 GHz) and radio system (N).

FIG. 7 is a sequence diagram showing the details of operation for specifying terminal information.

Referring to FIG. 7, the in-service area management server 104 sends a request for terminal information to the radio terminal 100 or the cellular phone 101 via the radio base station 102 or the service terminal 103 (FIG. 7, step 601). The radio terminal 100 or the cellular phone 101 sends back terminal information or link information for accessing terminal information, which are stored in the storage 200, to the in-service area management server 104 (step 602).

The in-service area management server 104 determines whether obtained information is terminal information or link information (step 603). If the obtained information is link information (step 603, No), the in-service area management server 104 accesses linked terminal information in the terminal management server 108 (step 604).

The terminal management server 108 sends terminal information to the in-service area management server 104 (step 605). The in-service area management server 104 forwards the terminal information to the radio base station 102 or the service terminal 103 (step 606).

If the obtained information is terminal information (step 603, Yes), the in-service area management server 104 sends the terminal information to the radio base station 102 or the service terminal 103 (step 606).

In this manner, terminal information is specified (step 607).

Incidentally, the operation for specifying terminal information (FIG. 4, step 403) may be performed before the operation for specifying location information and time information (step 402).

After that, operation for accounting, making another provider's service available, and downloading radio software is carried out (step 404).

FIG. 8 is a sequence diagram showing the details of operation for accounting, making another provider's service available, and downloading radio software.

Referring to FIG. 8, the in-service area management server 104 informs the available service management server 111 of the obtained location information, time information and terminal information (FIG. 8, step 701). The available service management server 111 extracts available services based on the location information, time information and terminal information (step 702). The available service management server 111 informs the in-service area management server 104 of the extracted available services (step 703). The in-service area management server 104 forwards the information as to the available services to the radio base station 102 or the service terminal 103 (step 704). Then, the radio base station 102 or the service terminal 103 forwards the information as to the available services to the radio terminal 100 or the cellular phone 101 (step 705).

The radio terminal 100 or the cellular phone 101 and/or the service terminal 103 informs the user of the available services and the contents of the services through the display section 201 or the output section 208 by image, voice or the like (step 706).

FIG. 9 is a diagram showing an example of service contents displayed on the display section 201.

As shown in FIG. 9, the contents of the available services are displayed based on the location information or destination (country, area), time information and terminal information. In the table of FIG. 9, services which have been determined to be unavailable based on the terminal information are indicated with the mark (-). In addition, download charges, expected usage charges estimated from the past utilization and the like are also displayed on the display section 201 to help the user in deciding on a service used. The user selects a service to be used and his/her choice of payment through the input section 203 (step 707).

The radio terminal 100, the cellular phone 101 or the service terminal 103 informs the in-service area management server 104 of the selected service including usage charge and the mode of payment such as whether the user makes a payment by the service terminal 103, by cash or by credit card, together with card number and the like (step 708). Accordingly, the in-service area management server 104 decides the mode of payment for the service (step 709). When the payment is made by the service terminal 103 (step 709, Yes), the in-service area management server 104 sends a request for payment to the service terminal 103 (step 710). When the user has selected otherwise (step 709, No), the in-service area management server 104 sends a request for payment to the accounting management server 109 (step 711). The accounting management server 109 informs a credit card company of the card number and the usage charge to arrange for payment or settle an account (step 712). The accounting management server 109 informs the in-service area management server 104 of the completion of payment or the settlement of an account (step 713).

The service terminal 103 and the in-service area management server 104 confirm the completion of payment (step 714). After that, the in-service area management server 104 informs the available service management server 111 of the service selected by the user (step 715).

The available service management server 111 determines a provider of the service based on the service selected by the user (step 716). The available service management server 111 accesses the other provider management server 113 on behalf of the user to inform the server 113 of user information and the service requested by the user (step 717). The other provider management server 113 conducts user registration, and carries out a procedure for making the requested service available to the radio terminal 100 or the cellular phone 101. That is, the other provider management server 113 sets communication information so that the radio terminal 100 or the cellular phone 101 can receive the requested service (step 718). Having completed the procedure, the other provider management server 113 informs the available service management server 111 of the completion of the procedure with the type of the requested service (step 719). The available service management server 111 forwards the information as to the completion of the procedure to the in-service area management server 104 (step 720).

When payment and the procedure in the other provider for making the requested service available to the user have been completed, the in-service area management server 104 requests the radio software management server 107 to send radio software necessary for using the requested service (software enabling the radio terminal 100 or the cellular phone 101 to have a radio communication in a place at a time according to the location information and time information) to the radio terminal 100 or the cellular phone 101 (step 721). The radio software management server 107 determines radio software corresponding to the requested service (step 722). Then, the radio software is downloaded from the radio software management server 107 to the in-service area management server 104 (step 723).

Further, the radio software is downloaded from the in-service area management server 104 to the radio terminal 100 or the cellular phone 101 via the radio base station 102 or the service terminal 103 (step 724).

The radio terminal 100 or the cellular phone 101 stores the downloaded radio software in the storage 200. In addition, the terminal information in the storage 200 is updated according to the radio system of the newly added or updated radio software (e.g. M) (step 725).

After that, the radio terminal 100 or the cellular phone 101 informs the in-service area management server 104 of the radio system of the radio software via the radio base station 102 or the service terminal 103 (step 726). The in-service area management server 104 informs the terminal management server 108 of the radio system of the radio software (step 727). The terminal management server 108 stores the radio system of the radio software as part of the terminal information, thus updating the terminal information (step 728). Having updating the terminal information, the terminal management server 108 informs the in-service area management server 104 as to the completion of the update of the terminal information (step 729).

The in-service area management server 104 forwards the information as to the completion of the update of the terminal information to the radio base station 102 or the service terminal 103 (step 730). The radio base station 102 or the service terminal 103 informs the radio terminal 100 or the cellular phone 101 as to the completion of the update of the terminal information (step 731). In this manner, operation for accounting, making another provider's service available, and downloading radio software is carried out.

Next, the radio terminal 100, the cellular phone 101 or the service terminal 103 informs the user that downloading of radio software has been completed and the radio system of the radio software has become available through the display section 201 and the output section 208 by an image, voice, or the like (FIG. 4, step 405). The radio terminal 100 or the cellular phone 101 cuts off the wired or wireless connection with the radio base station 102 or the service terminal 103 (step 406).

In the following, a description will be given in detail of the second embodiment of the present invention.

A radio software acquisition system, a cellular phone and a service terminal according to the second embodiment each have essentially the same construction as those shown in FIGS. 1, 2 and 3, respectively. The second embodiment differs form the first embodiment in that location information and time information are specified by not ticket information but personal information, and the radio terminal 100 or the cellular phone 101 determines a service to be used and the mode of payment according to the rules.

FIG. 10 is a sequence diagram showing operation for specifying location information and time information (FIG. 4 step 402) according to the second embodiment of the present invention.

In FIG. 6(*c*), personal information includes a schedule (attend conference), location information (country: A, area: 2, city: 3) and time information (May 12).

Referring to FIG. 10, the in-service area management server 104 sends a request for personal information to the radio terminal 100 or the cellular phone 101 via the radio base station 102 or the service terminal 103 (FIG. 10, step 901). The radio terminal 100 or the cellular phone 101 sends back personal information or link information for accessing personal information, which are stored in the storage 200, to the in-service area management server 104 (step 902). On this occasion, personal information may be input to the service terminal 103 by the user through the input section 203 so that the in-service area management server 104 can obtain the personal information therefrom.

The in-service area management server 104 determines whether obtained information is personal information or link information (step 903). If the obtained information is link information (step 903, Yes), the in-service area management server 104 accesses linked personal information in the personal information management server 112 (step 904).

The personal information management server 112 sends the in-service area management server 104 location information and time information related to the personal information (step 907). The in-service area management server 104 forwards the location information and time information to the radio base station 102 or the service terminal 103 (step 908).

If the obtained information is personal information (step 903, No), the in-service area management server 104 sends location information and time information included in the personal information to the radio base station 102 or the service terminal 103 (step 908).

The radio base station 102 or the service terminal 103 informs the radio terminal 100 or the cellular phone 101 of the location information and time information (step 909). Thus, relevant location information and time information are specified by the personal information (step 910).

Next, operation for accounting, making another provider's service available, and downloading radio software (FIG. 4, step 404) will be described.

Figure 11:
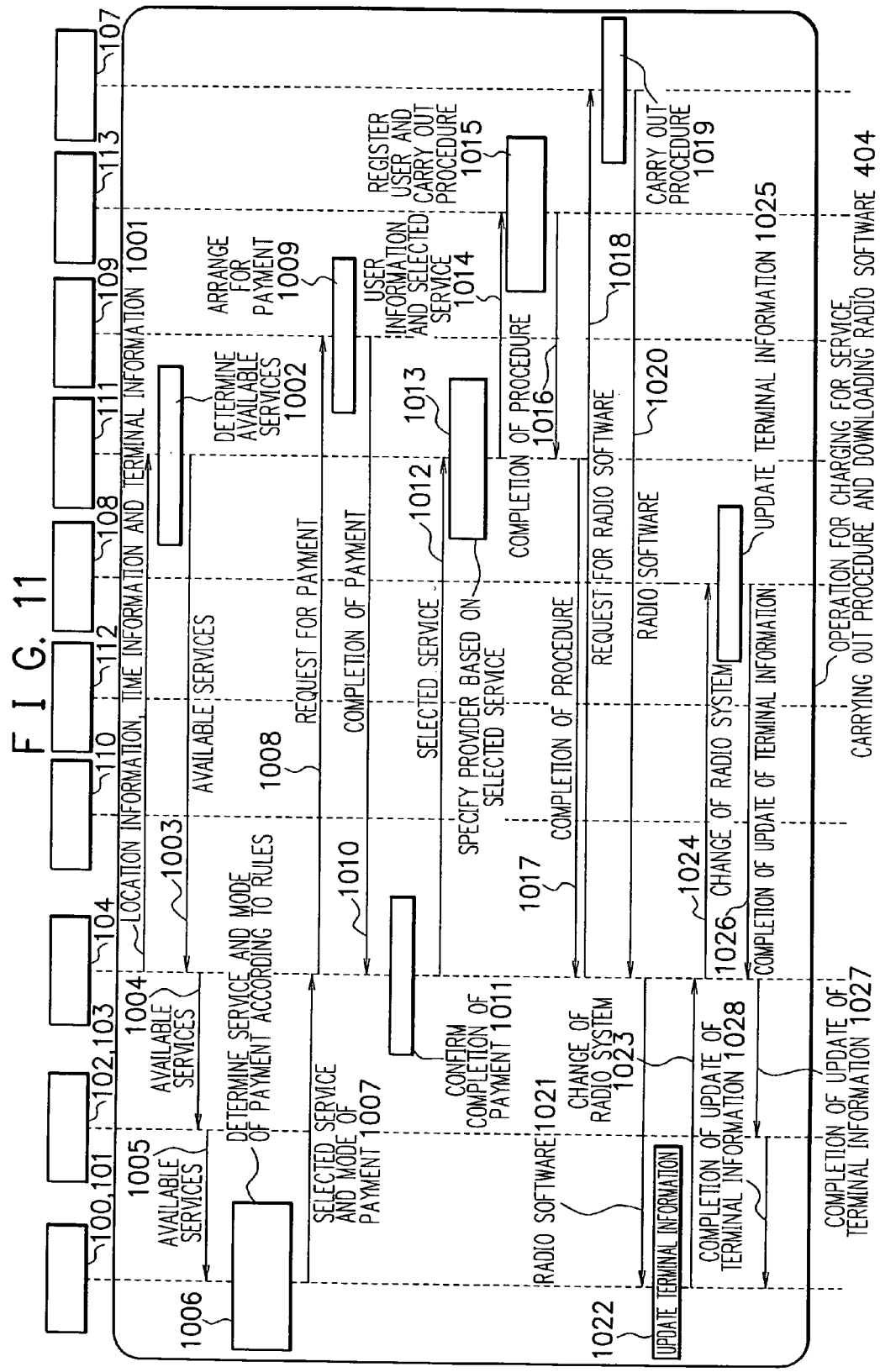
FIG. 11 is a sequence diagram showing operation for downloading radio software, etc. according to the second embodiment of the present invention.

FIG. 11 is a sequence diagram showing the details of operation for accounting, making another provider's service available, and downloading radio software.

Referring to FIG. 11, the in-service area management server 104 informs the available service management server 111 of the obtained location information, time information and terminal information (FIG. 11, step 1001). The available service management server 111 extracts available services based on the location information, time information and terminal information (step 1002). The available service management server 111 informs the in-service area management server 104 of the extracted available services (step 1003). The in-service area management server 104 forwards the information as to the available services to the radio base station 102 or the service terminal 103 (step 1004). Then, the radio base station 102 or the service terminal 103 forwards the information as to the available services to the radio terminal 100 or the cellular phone 101 (step 1005).

The radio terminal 100 or the cellular phone 101 determines a service to be used and the mode of payment according to the predetermined rules (step 1006).

The rules are conditions or guidelines for making the selection of a service and the mode of payment, such as the order of priority or indispensable requisites, which the user has set on the radio terminal 100 or the cellular phone 101 in advance.

As a concrete example of the rules, the selection of a service to be used may be made in accordance with the following priorities: (1) e-mail service must be available; (2) expected usage charge in a period of service is the smallest; and (3) charge for download is the smallest.

Besides, the selection of the mode of payment may be made in accordance with the following priorities (1) pay by card; and (2) pay by cash.

By setting such rules in advance, a radio system, which provides e-mail service, the smallest usage charge and the cheapest download, is selected. Additionally, if payment can be made by credit card, "card payment" is to be made. On the other hand, if payment cannot be made by credit card, "cash payment" is to be made.

The radio terminal 100, the cellular phone 101 or the service terminal 103 informs the in-service area management server 104 of the selected service and the mode of payment (step 1007). The in-service area management server 104 sends a request for payment to the accounting management server 109 (step 1008). The accounting management server 109 arranges for payment or settles an account (step 1009). The accounting management server 109 informs the in-service area management server 104 of the completion of payment or the settlement of an account (step 1010). The in-service area management server 104 confirms the completion of payment (step 1011).

After that, the in-service area management server 104 informs the available service management server 111 of the service selected by the user (step 1012). The available service management server 111 determines a provider of the service based on the service selected by the user (step 1013). The available service management server 111 accesses the other provider management server 113 on behalf of the user to inform the server 113 of user information and the service requested by the user (step 1014). The other provider management server 113 conducts user registration, and carries out a procedure for making the requested service available to the user (1015).

Having completed the procedure, the other provider management server 113 informs the available service management server 111 of the completion of the procedure (step 1016). The available service management server 111 forwards the information as to the completion of the procedure to the in-service area management server 104 (step 1017). When payment and the procedure for making the requested service available to the user in the other provider have been completed, the in-service area management server 104 requests the radio software management server 107 to send radio software necessary for using the requested service (step 1018). The radio software management server 107 determines radio software corresponding to the requested service (step 1019). Then, the radio software is downloaded from the radio software management server 107 to the in-service area management server 104 (step 1020).

Further, the radio software is downloaded from the in-service area management server 104 to the radio terminal 100 or the cellular phone 101 via the radio base station 102 or the service terminal 103 (step 1021). The radio terminal 100 or the cellular phone 101 stores the downloaded software in the storage 200. In addition, the terminal information in the storage 200 is updated according to the radio system of the newly added or updated radio software (step 1022). After that, the radio terminal 100 or the cellular phone 101 informs the in-service area management server 104 that the terminal information has been updated via the radio base station 102 or the service terminal 103 (step 1023). The in-service area management server 104 informs the terminal management server 108 that the terminal information has been updated (step 1024).

The terminal management server 108 stores the radio system of the radio software, thus updating the terminal information (step 1025). Having updating the terminal information, the terminal management server 108 informs the in-service area management server 104 as to the completion of the update of the terminal information (step 1026). The in-service area management server 104 forwards the information as to the completion of the update of the terminal information to the radio base station 102 or the service terminal 103 (step 1027). The radio base station 102 or the service terminal 103 informs the radio terminal 100 or the cellular phone 101 as to the completion of the update of the terminal information (step 1028). In this manner, operation for accounting, making another provider's service available, and downloading radio software is performed.

As set forth hereinabove, in accordance with the present invention, radio software, which enables radio communications in a country (area, city) where a user visits on business or the like, has already been downloaded to the cellular phone or the radio terminal. Therefore, the cellular phone or the radio terminal is readily available for a radio communication as need arises. Thus, the usability of the cellular phone and the radio terminal can be improved.

Moreover, radio software is downloaded based on location information and time information included in ticket information or personal information such as schedule. In addition, necessary procedure with another provider is performed comprehensively, which saves the user a lot of trouble. Thereby, power saving can be achieved.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A radio software acquisition system comprising a portable radio terminal, an in-service area management server, an available service management server, and a radio software management server, wherein:

the portable radio terminal stores terminal information and ticket information including location information and time information in a storage, sends the ticket information and terminal information read out of the storage to the in-service area management server so as to be informed of available services, informs the in-service area management server of a service to be used selected from the available services by a user, receives radio software and stores the radio software in the storage;

the in-service area management server forwards the ticket information and terminal information received from the portable radio terminal to the available service management server so as to be informed of available services, informs the portable radio terminal of the available services, forwards information as to the selected service received from the portable radio terminal to the radio software management server, and forwards radio software received from the radio software management server to the portable radio terminal;

the available service management server determines available services based on the terminal information and the location information and time information included in the ticket information received from the in-service area management server, and informs the in-service area management server of the available services; and the radio software management server receives the information as to the selected service from the in-service area management server, and sends radio software corresponding to the selected service to the in-service area management server.

2. The radio software acquisition system claimed in claim 1, further comprising a ticket information management server and a terminal management server, wherein:

the portable radio terminal stores terminal link information indicating the location of the terminal information and ticket link information indicating the location of the location information and time information in a storage, sends the ticket link information and terminal link information read out of the storage to the in-service area management server so as to be informed of available services, informs the in-service area management server of a service to be used selected from the available services by a user, receives radio software and stores the radio software in the storage; and the in-service area management server receives the ticket link information and terminal link information from the portable radio terminal, fetches the ticket information from the ticket information management server based on the ticket link information, fetches the terminal information from the terminal management server based on the terminal link information, sends the ticket information and terminal information to the available service management server so as to be informed of available services, informs the portable radio terminal of the available services, forwards information as to the selected service received from the portable radio terminal to the radio software management server, and forwards radio software received from the radio software management server to the portable radio terminal.

3. A radio software acquisition system comprising a portable radio terminal, an in-service area management server, an available service management server, and a radio software management server, wherein:

the portable radio terminal stores terminal information and personal information including location information and time information in a storage, sends the personal information and terminal information read out of the storage to the in-service area management server so as to be informed of available services, informs the in-service area management server of a service to be used selected from the available services by a user, receives radio software and stores the radio software in the storage;

the in-service area management server forwards the personal information and terminal information received from the portable radio terminal to the available service management server so as to be informed of available services, informs the portable radio terminal of the available services, forwards information as to the selected service received from the portable radio terminal to the radio software management server, and forwards radio software received from the radio software management server to the portable radio terminal;

the available service management server determines available services based on the terminal information and the location information and time information included in the personal information received from the in-service area management server, and informs the in-service area management server of the available services; and the radio software management server receives the information as to the selected service from the in-service area management server, and sends radio software corresponding to the selected service to the in-service area management server.

4. The radio software acquisition system claimed in claim 3, further comprising a personal information management server and a terminal management server, wherein:

the portable radio terminal stores terminal link information indicating the location of the terminal information and personal link information indicating the location of the location information and time information in a storage, sends the personal link information and terminal link information read out of the storage to the in-service area management server so as to be informed of available services, informs the in-service area management server of a service to be used selected from the available services by a user, receives radio software and stores the radio software in the storage; and the in-service area management server receives the personal link information and terminal link information from the portable radio terminal, fetches the personal information from the personal information management server based on the personal link information, fetches the terminal information from the terminal management server based on the terminal link information, sends the personal information and terminal information to the available service management server so as to be informed of available services, informs the portable radio terminal of the available services, forwards information as to the selected service received from the portable radio terminal to the radio software management server, and forwards radio software received from the radio software management server to the portable radio terminal.

5. The radio software acquisition system claimed in claim 1, further comprising an accounting management server, wherein:
   the in-service area management server requests the accounting management server to make a charge for the service selected by the portable radio terminal; and
   the accounting management server makes a charge for the selected service in response to the request from the in-service area management server.

6. The radio software acquisition system claimed in claim 2, further comprising an accounting management server, wherein:
   the in-service area management server requests the accounting management server to make a charge for the service selected by the portable radio terminal; and
   the accounting management server makes a charge for the selected service in response to the request from the in-service area management server.

7. The radio software acquisition system claimed in claim 3, further comprising an accounting management server, wherein:
   the in-service area management server requests the accounting management server to make a charge for the service selected by the portable radio terminal; and
   the accounting management server makes a charge for the selected service in response to the request from the in-service area management server.

8. The radio software acquisition system claimed in claim 4, further comprising an accounting management server, wherein:
   the in-service area management server requests the accounting management server to make a charge for the service selected by the portable radio terminal; and
   the accounting management server makes a charge for the selected service in response to the request from the in-service area management server.

9. The radio software acquisition system claimed in claim 1, further comprising an other provider management server, wherein:
   the other provider management server receives the information as to the selected service from the available service management server, carries out a procedure for making the selected service available to the portable radio terminal, and informs the available service management server that the necessary procedure has been completed;
   the available service management server informs the other provider management server of the selected service, and forwards information as to the completion of the necessary procedure received from the other provider management server to the in-service area management server; and
   the in-service area management server receives the information as to the completion of the necessary procedure from the available service management server, and sends the information as to the selected service to the radio software management server.

10. The radio software acquisition system claimed in claim 2, further comprising an other provider management server, wherein:
    the other provider management server receives the information as to the selected service from the available service management server, carries out a procedure for making the selected service available to the portable radio terminal, and informs the available service management server that the necessary procedure has been completed;
    the available service management server informs the other provider management server of the selected service, and forwards information as to the completion of the necessary procedure received from the other provider management server to the in-service area management server; and
    the in-service area management server receives the information as to the completion of the necessary procedure from the available service management server, and sends the information as to the selected service to the radio software management server.

11. The radio software acquisition system claimed in claim 3, further comprising an other provider management server, wherein:
    the other provider management server receives the information as to the selected service from the available service management server, carries out a procedure for making the selected service available to the portable radio terminal, and informs the available service management server that the necessary procedure has been completed;
    the available service management server informs the other provider management server of the selected service, and forwards information as to the completion of the necessary procedure received from the other provider management server to the in-service area management server; and
    the in-service area management server receives the information as to the completion of the necessary procedure from the available service management server, and sends the information as to the selected service to the radio software management server.

12. The radio software acquisition system claimed in claim 4, further comprising an other provider management server, wherein:
    the other provider management server receives the information as to the selected service from the available service management server, carries out a procedure for making the selected service available to the portable radio terminal, and informs the available service management server that the necessary procedure has been completed;
    the available service management server informs the other provider management server of the selected service, and forwards information as to the completion of the necessary procedure received from the other provider management server to the in-service area management server; and
    the in-service area management server receives the information as to the completion of the necessary procedure from the available service management server, and sends the information as to the selected service to the radio software management server.

13. The radio software acquisition system claimed in claim 2, wherein:
  having received the radio software, the portable radio terminal updates radio system information included in the terminal information stored in the storage, and sends information as to the update of the terminal information to the in-service area management server; and
  having received the information as to the update of the terminal information, the in-service area management server forwards the informatio 14. The radio software acquisition system claimed in claim 4, wherein:
  having received the radio software, the portable radio terminal updates radio system information included in the terminal information stored in the storage, and sends information as to the update of the terminal information to the in-service area management server; and
  having received the information as to the update of the terminal information, the in-service area management server forwards the information to the terminal management server.

15. The radio software acquisition system claimed in claim 1, wherein the portable radio terminal selects a service to be used from among available services according to preestablished rules.

16. The radio software acquisition system claimed in claim 2, wherein the portable radio terminal selects a service to be used from among available services according to preestablished rules.

17. The radio software acquisition system claimed in claim 3, wherein the portable radio terminal selects a service to be used from among available services according to preestablished rules.

18. The radio software acquisition system claimed in claim 4, wherein the portable radio terminal selects a service to be used from among available services according to preestablished rules.

19. A radio software acquisition method for a radio software acquisition system comprising a portable radio terminal, an in-service area management server, an available service management server, and a radio software management server, the radio software acquisition method comprising:
  a portable radio step at which the portable radio terminal stores terminal information and ticket information including location information and time information in a storage, sends the ticket information and terminal information read out of the storage to the in-service area management server so as to be informed of available services, informs the in-service area management server of a service to be used selected from the available services by a user, receives radio software and stores the radio software in the storage;
  an in-service area management step at which the in-service area management server forwards the ticket information and terminal information received from the portable radio terminal to the available service management server so as to be informed of available services, informs the portable radio terminal of the available services, forwards information as to the selected service received from the portable radio terminal to the radio software management server, and forwards radio software received from the radio software management server to the portable radio terminal;
  an available service management step at which the available service management server determines available services based on the terminal information and the location information and time information included in the ticket information received from the in-service area management server, and informs the in-service area management server of the available services; and
  a radio software management step at which the radio software management server receives the information as to the selected service from the in-service area management server, and sends radio software corresponding to the selected service to the in-service area management server.

20. The radio software acquisition method claimed in claim 15, for the radio software acquisition system further comprising a ticket information management server and a terminal management server, wherein:
  at the portable radio step, the portable radio terminal stores terminal link information indicating the location of the terminal information and ticket link information indicating the location of the location information and time information in a storage, sends the ticket link information and terminal link information read out of the storage to the in-service area management server so as to be informed of available services, informs the in-service area management server of a service to be used selected from the available services by a user, receives radio software and stores the radio software in the storage; and
  at the in-service area management step, the in-service area management server receives the ticket link information and terminal link information from the portable radio terminal, fetches the ticket information from the ticket information management server based on the ticket link information, fetches the terminal information from the terminal management server based on the terminal link information, sends the ticket information and terminal information to the available service management server so as to be informed of available services, informs the portable radio terminal of the available services, forwards information as to the selected service received from the portable radio terminal to the radio software management server, and forwards radio software received from the radio software management server to the portable radio terminal.

21. A radio software acquisition method for a radio software acquisition system comprising a portable radio terminal, an in-service area management server, an available service management server, and a radio software management server, the radio software acquisition method comprising:
  a portable radio step at which the portable radio terminal stores terminal information and personal information including location information and time information in a storage, sends the personal information and terminal information read out of the storage to the in-service area management server so as to be informed of available services, informs the in-service area management server of a service to be used selected from the available services by a user, receives radio software and stores the radio software in the storage;
  an in-service area management step at which the in-service area management server forwards the personal information and terminal information received from the portable radio terminal to the available service management server so as to be informed of available services, informs the portable radio terminal of the available services, forwards information as to the selected service received from the portable radio terminal to the radio software management server, and forwards radio software received from the radio software management server to the portable radio terminal;

an available service management step at which the available service management server determines available services based on the terminal information and the location information and time information included in the personal information received from the in-service area management server, and informs the in-service area management server of the available services; and a radio software management step at which the radio software management server receives the information as to the selected service from the in-service area management server, and sends radio software corresponding to the selected service to the in-service area management server.

22. The radio software acquisition method claimed in claim 21, for the radio software acquisition system further comprising a personal information management server and a terminal management server, wherein:

at the portable radio step, the portable radio terminal stores terminal link information indicating the location of the terminal information and personal link information indicating the location of the location information and time information in a storage, sends the personal link information and terminal link information read out of the storage to the in-service area management server so as to be informed of available services, informs the in-service area management server of a service to be used selected from the available services by a user, receives radio software and stores the radio software in the storage; and at the in-service area management step, the in-service area management server receives the personal link information and terminal link information from the portable radio terminal, fetches the personal information from the personal information management server based on the personal link information, fetches the terminal information from the terminal management server based on the terminal link information, sends the personal information and terminal information to the available service management server so as to be informed of available services, informs the portable radio terminal of the available services, forwards information as to the selected service received from the portable radio terminal to the radio software management server, and forwards radio software received from the radio software management server to the portable radio terminal.

23. The radio software acquisition method claimed in claim 19, further comprising an accounting management step, wherein:

at the in-service area management step, the in-service area management server requests an accounting management server to make a charge for the service selected by the portable radio terminal; and at the accounting management step, the accounting management server makes a charge for the selected service in response to the request from the in-service area management server.

24. The radio software acquisition method claimed in claim 20, further comprising an accounting management step, wherein:

at the in-service area management step, the in-service area management server requests an accounting management server to make a charge for the service selected by the portable radio terminal; and at the accounting management step, the accounting management server makes a charge for the selected service in response to the request from the in-service area management server.

25. The radio software acquisition method claimed in claim 21, further comprising an accounting management step, wherein:

at the in-service area management step, the in-service area management server requests an accounting management server to make a charge for the service selected by the portable radio terminal; and at the accounting management step, the accounting management server makes a charge for the selected service in response to the request from the in-service area management server.

26. The radio software acquisition method claimed in claim 22, further comprising an accounting management step, wherein:

at the in-service area management step, the in-service area management server requests an accounting management server to make a charge for the service selected by the portable radio terminal; and at the accounting management step, the accounting management server makes a charge for the selected service in response to the request from the in-service area management server.

27. The radio software acquisition method claimed in claim 19, further comprising an other provider management step, wherein:

at the other provider management step, an other provider management server receives the information as to the selected service from the available service management server, carries out a procedure for making the selected service available to the portable radio terminal, and informs the available service management server that the necessary procedure has been completed;

at the available service management step, the available service management server informs the other provider management server of the selected service, and forwards information as to the completion of the necessary procedure received from the other provider management server to the in-service area management server; and at the in-service area management step, the in-service area management server receives the information as to the completion of the necessary procedure from the available service management server, and sends the information as to the selected service to the radio software management server.

28. The radio software acquisition method claimed in claim 20, further comprising an other provider management step, wherein:

at the other provider management step, an other provider management server receives the information as to the selected service from the available service management server, carries out a procedure for making the selected service available to the portable radio terminal, and informs the available service management server that the necessary procedure has been completed;

at the available service management step, the available service management server informs the other provider management server of the selected service, and forwards information as to the completion of the necessary procedure received from the other provider management server to the in-service area management server; and at the in-service area management step, the in-service area management server receives the information as to the completion of the necessary procedure from the available service management server, and sends the information as to the selected service to the radio software management server.

29. The radio software acquisition method claimed in claim 21, further comprising an other provider management step, wherein:

at the other provider management step, an other provider management server receives the information as to the selected service from the available service management server, carries out a procedure for making the selected service available to the portable radio terminal, and informs the available service management server that the necessary procedure has been completed;

at the available service management step, the available service management server informs the other provider management server of the selected service, and forwards information as to the completion of the necessary procedure received from the other provider management server to the in-service area management server; and at the in-service area management step, the in-service area management server receives the information as to the completion of the necessary procedure from the available service management server, and sends the information as to the selected service to the radio software management server.

30. The radio software acquisition method claimed in claim 22, further comprising an other provider management step, wherein:

at the other provider management step, an other provider management server receives the information as to the selected service from the available service management server, carries out a procedure for making the selected service available to the portable radio terminal, and informs the available service management server that the necessary procedure has been completed;

at the available service management step, the available service management server informs the other provider management server of the selected service, and forwards information as to the completion of the necessary procedure received from the other provider management server to the in-service area management server; and at the in-service area management step, the in-service area management server receives the information as to the completion of the necessary procedure from the available service management server, and sends the information as to the selected service to the radio software management server.

31. The radio software acquisition method claimed in claim 20, wherein:

at the portable radio step, having received the radio software, the portable radio terminal updates radio system information included in the terminal information stored in the storage, and sends information as to the update of the terminal information to the in-service area management server; and at the in-service area management step, having received the information as to the update of the terminal information, the in-service area management server forwards the information to the terminal management server.

32. The radio software acquisition method claimed in claim 22, wherein:

at the portable radio step, having received the radio software, the portable radio terminal updates radio system information included in the terminal information stored in the storage, and sends information as to the update of the terminal information to the in-service area management server; and at the in-service area management step, having received the information as to the update of the terminal information, the in-service area management server forwards the information to the terminal management server.

33. The radio software acquisition method claimed in claim 19, wherein, at the portable radio step, the portable radio selects a service to be used from among available services according to preestablished rules.

34. The radio software acquisition method claimed in claim 20, wherein, at the portable radio step, the portable radio selects a service to be used from among available services according to preestablished rules.

35. The radio software acquisition method claimed in claim 21, wherein, at the portable radio step, the portable radio selects a service to be used from among available services according to preestablished rules.

36. The radio software acquisition method claimed in claim 22, wherein, at the portable radio step, the portable radio selects a service to be used from among available services according to preestablished rules.

37. A radio software acquisition program for implementing the respective steps involved in the radio software acquisition method claimed in one of the claims 19 to 36 on a computer.

* * * * *